US008452866B2

(12) United States Patent
De Boer et al.

(10) Patent No.: US 8,452,866 B2
(45) Date of Patent: May 28, 2013

(54) NETWORK RESOURCE MANAGEMENT

(75) Inventors: Michel De Boer, Loenen aande vecht (NL); Hugh Carr, County Wicklow (IE); Wim Wedershoven, Woerden (NL); Klaas Wijbrans, Rijen (NL); Igor Radovanović, Eindhoven (NL); Tanir Özçelebi, Eindhoven (NL)

(73) Assignee: Markport Limited, Dublin (IE)

( * ) Notice: Subject to any disclaimer, the term of this patent is extended or adjusted under 35 U.S.C. 154(b) by 497 days.

(21) Appl. No.: 12/733,132

(22) PCT Filed: Jul. 17, 2008

(86) PCT No.: PCT/IE2008/000075
§ 371 (c)(1),
(2), (4) Date: Aug. 6, 2010

(87) PCT Pub. No.: WO2009/019671
PCT Pub. Date: Feb. 12, 2009

(65) Prior Publication Data
US 2010/0299433 A1 Nov. 25, 2010

Related U.S. Application Data

(60) Provisional application No. 60/935,369, filed on Aug. 9, 2007.

(51) Int. Cl.
*G06F 15/173* (2006.01)
(52) U.S. Cl.
USPC .......................................................... 709/224
(58) Field of Classification Search
USPC .......................................................... 709/224
See application file for complete search history.

(56) References Cited

U.S. PATENT DOCUMENTS

| 7,475,130 | B2* | 1/2009 | Silverman | 709/223 |
| 7,581,008 | B2* | 8/2009 | Zhang et al. | 709/226 |
| 2003/0225549 | A1 | 12/2003 | Shay | |
| 2004/0010582 | A1* | 1/2004 | Oliver | 709/224 |

(Continued)

FOREIGN PATENT DOCUMENTS
WO 2006/015427 2/2006

*Primary Examiner* — Brian P Whipple
(74) *Attorney, Agent, or Firm* — Jacobson Holman PLLC

(57) ABSTRACT

The invention provides real time dynamic resource management to improve end-to-end QoS by mobile devices regularly updating a resource availability server (RAS) with resource update information. Examples of resource update information are device battery status, available memory, session bandwidth, delay, packet loss, and jitter, network element storage capacity, network element processing power. This information is made available by the RAS. In addition, the RAS generates and maintains predictive models and makes available predictive data from these models. Network elements and devices retrieve this information in the form of notifications from the RAS or by way of querying the RAS. The network elements and devices, based on these predictions, act to negotiate sessions to optimise QoS. In one embodiment the RAS is updated by only mobile devices subscribed to the operator which hosts the RAS. The update information is addressed to the RAS as a stand-alone entity. However, it is envisaged that the server may be hosted by multiple operators and may receive updates from devices subscribed to different operators. Also, it is envisaged that not only mobile devices but also network elements such as MMSCs may send update information.

38 Claims, 4 Drawing Sheets

U.S. PATENT DOCUMENTS

| | | |
|---|---|---|
| 2005/0097207 A1* | 5/2005 | Gluhovsky et al. ........... 709/224 |
| 2006/0136578 A1* | 6/2006 | Covell et al. .................. 709/223 |
| 2007/0027975 A1 | 2/2007 | Tai |
| 2007/0153916 A1 | 7/2007 | Demircin |

* cited by examiner

A publishes QoS parameters to the RAS during a session

NETWORK RESOURCE MANAGEMENT

This is a national stage of PCT/IE08/000,075 filed Jul. 17, 2008 and published in English, claiming benefit of U.S. provisional application No. 60/935,369, filed Aug. 9, 2007, hereby incorporated by reference.

FIELD OF THE INVENTION

The invention relates to packet networks such as IMS mobile networks. The field of the invention includes end-to-end data delivery involving mobile and/or fixed devices and/or application servers where controlled networks are delivering services through uncontrolled access networks.

PRIOR ART DISCUSSION

The convergence concept of the emerging IP Multimedia Subsystem (IMS) includes controlled networks, delivering IP multimedia services through uncontrolled access networks which can be unlicensed, non-dedicated, non-deterministic.

Thus Access networks such as Wireless LAN (e.g. most commonly IEEE 802.11<x> commonly known as Wi-Fi) or Ethernet (e.g. most commonly IEEE 802.3<x>) or public broadband networks (e.g., ADSL, cable) are expected to become a significant point of access to resource intensive real-time multimedia services provided in the IP Multimedia Subsystem (IMS) core network.

Operators are generally not the owners of such Wireless LAN, Ethernet or public broadband access networks and thus cannot control the quality of service offered by such access networks and hence lack control of end-to-end QoS. Additionally; a single access network is potentially shared by multiple operators which do not have visibility of traffic generated by each other.

Existing mechanisms for end-to-end QoS only work when the operator controls the complete end-to-end path. For Integrated Services (e.g. RSVP) resources along the communication path are reserved upfront to the actual media session. One can only reserve resources in a network that one controls. For Differentiated Services, traffic is classified and marked (e.g. DSCP marking) at the edge of the network. Based on the marking the network can prioritize traffic during congestion periods. The classification and marking must be aligned throughout the whole, network. These mechanisms work in fully controlled networks such as for example a closed IMS network or a PacketCable/DOCSIS network. For access networks outside the control of the operator these mechanisms do not work.

However, IMS Subscribers, regardless of their access point, expect the same quality of service that they have thus far enjoyed with traditional Telecom Services.

Wireless LAN, Ethernet and public broadband networks do not facilitate the provision of dynamic resource reservations such as bandwidth or changing the assignment of such resources in real time, particularly not during active sessions.

Wireless LAN, Ethernet and public broadband networks are non-dedicated, implementing a "best-effort delivery" principle, allowing all applications access to some but not necessarily sufficient network resources.

Wireless LAN, Ethernet and public broadband networks have non-deterministic performance. Thus since resource availability can vary dynamically (for example many times during a single multimedia session) with attendant degradation of end user experience, the quality of the multimedia service negotiated during session setup is not guaranteed, undermining the relevance and integrity of such pre-session negotiation. This pre-session limitation is present even in current SIP QoS negotiation mechanisms.

From the end user perspective the inability to be guaranteed the requested or expected end-to-end QoS, leads to degradation in user experience. The deterioration effect is especially apparent while using resource-demanding services such as multimedia streaming with likely scenarios such as received content becoming distorted, for example with annoying visual artefacts and pauses during real-time playback.

Operators thus face very significant challenges in endeavouring to provide guaranteed end-to-end quality for resource intensive real-time IMS services. Furthermore, as has been described, since access networks such as Wireless LAN. Ethernet and public broadband access networks are non-deterministic, even if the operator owned such access networks, currently it is not feasible to guarantee sufficient network resources for desired QoS.

Also, non-determinate access networks exhibit degradation characteristics from environmental factors. Thus for example Wireless LAN networks (e.g. most commonly IEEE 802.11<x>) operate in the Industrial, Scientific and Medical (ISM) band around 2.45 GHz, which is shared by many license-free error tolerant systems (e.g. Bluetooth, cordless phones, garage openers, etc.) and is "polluted" by non-communication systems, like for example the radiation from a microwave oven. Even devices on access networks like GPRS or 3G are susceptible to electrical noise. These interfering systems cause many errors in communication making it challenging to provide guaranteed quality of real-time multimedia services. Thus, even if resource reservations can be guaranteed by operators, this problem still persists.

Existing techniques for QoS adaptation of an established session are based on end-to-end signalling between the peers of the session. For example, the RTP protocol has the companion protocol RTCP that peers use to signal parameters like jitter, delay and packet loss to each other. The receiver directly signals quality parameters and/or resource availability about the received media stream to the transmitter. Based on this information the transmitter may decide to change the media characteristics, i.e. switch to a less bandwidth-consuming video codec in case of excessive packet loss. However, this approach tends to be reactive in an ad-hoc fashion, localized to the particular session and not centrally controlled.

US2004/0165605 describes an inter-provider internet protocol service provisioning system, in which real-time availability of resources of primary and secondary networks is determined for inter-network communication.

U.S. Pat. No. 7,289,453 describes quality of service management in which adaptive applications with real time requirements respond to time-varying resource availability of the end-to-end QoS path.

U.S. Pat. No. 6,687,495 describes a system which periodically issues queries to resources to ascertain user's dynamic state and scheduling queries based on service level agreement.

WO200562552 describes use of link quality information in infrastructure nodes using a predictive procedure which uses time-varying information of link status. This prediction is used to make a local decision on routing on particular links.

The invention is directed towards achieving improved resource management for improving end-to-end quality of service in packet switched networks (referred to simply as "packet networks").

| GLOSSARY | |
|---|---|
| DSCP | Differentiated Services Code Point |
| DOCSIS | Data Over Cable Service Interface Specifications |
| GPS | Global Positioning System |
| IMS | IP Multimedia Subsystem |
| LAN | Local Area Network |
| QoS | Quality of Service. |
| RAS | Resource Availability Server |
| RM | Resource Management component |
| RSVP | Resource Reservation Protocol |
| RTP | Real-time Transport Protocol |
| SIP | Session Initiation Protocol |
| SQA | Service Quality Adaptation |
| SQM | Service Quality Management |
| S-CSCF | Serving Call Session Control Function |

SUMMARY OF THE INVENTION

According to the invention, there is provided a method performed in one or more communication packet networks comprising user devices and network elements, the method comprising the steps of:
  resource management components of at least some of the devices automatically sending resource update information to a resource availability server, and
  the resource availability server using said resource update information to generate a predictive model for network resource characteristics for communication sessions, and making available the resource update information and predictive model data as server output data.

Making resource update information and network predictive information available in this manner allows more comprehensive network management than has been achieved heretofore.

In one embodiment, resource management components in network elements also transmit update information to the server.

In one embodiment, the resource management components measure communication parameters from RTP streams and include values of said parameters in the resource update information.

In one embodiment, the resource management components measure jitter, packet loss, and delay from incoming streams of RTP packets and bandwidth used as characterized by the RTP transmission interval and the RTP packet size, and upload said measurements to the resource availability server as update information.

In another embodiment, the update information includes device battery status, device screen mode, device or network element storage capacity, device or network element processing power, and device memory, and server load.

In one embodiment, a resource update component in at least one network element sends update information on behalf of a device with which it is communicating.

In one embodiment, the resource management components are incorporated in SIP clients.

In one embodiment, the resource availability server automatically notifies session quality management components of devices and network elements of server output data which will allow them to manage sessions for improved quality of service, and the devices and network elements act upon such notifications to improve quality of service.

In one embodiment, session quality management components of at least some of the devices and network elements query the resource availability server, retrieve server output data in response to the query, and use said retrieved data to manage sessions to improve quality of service for the sessions.

In one embodiment, the session management includes session negotiation, re-negotiation, denial, and abortion.

In one embodiment, the update information is routed by at least some resource management components to the session quality management components in addition to being sent to the resource availability server, and the session management components use said data and server output to make session management decisions.

In one embodiment, the session quality management components also use user preference or profile data to make decisions on session management.

In one embodiment, the resource availability server is part of a proxy in the network for signalling traffic and extracts update information from said traffic and adds said information to update information received from the resource management components. The proxy may be an S-CSCF.

The resource availability server may generate a predictive model of an access network to predict characteristics affecting a session between a device or network element in said access network and another device or network element.

In one embodiment, the resource availability server receives update information including feedback data concerning session re-negotiation by the session quality management components and updates the predictive model accordingly.

In one embodiment, the predictive model includes a statistical model, and/or a self-learning model to learn the behaviour of an access network over time, and/or a linear model which tracks current usage.

Preferably, the server output data includes predicted network congestion and load factor, and/or historical information associated with dates or times of day or with location.

In one embodiment, the resource availability server communicates with the devices and network elements according to the SIP control protocol.

In one embodiment, when generating the predictive model, the resource availability server calculates a load factor for a device as a weighted linear or non-linear combination of parameters:

$$\text{load factor} = (K_1 * \text{Delay} + K_2 * abs(\text{jitter}) + K_3 * \text{packetloss})$$

In one embodiment, when generating the predictive model, the server calculates the load factor of the network using individual device or network element load factors as samples.

In one embodiment, the server models a network by aggregating devices based on nearest neighbour analysis using IP address ranges, and/or geographical location, and/or type of access.

In one embodiment, the server calculates load factor using filters, in which all of the load factors of the individual devices form an input vector to a filter and the output is the aggregate load factor for the network as a whole.

Preferably, the server stores the load factors in a historical database, and correlates the historical data based on time of day, day of week, and week of year with the current load factor measured through the filters, and the predictive model provides a short term prediction based on historical trend to indicate whether quality is expected to deteriorate or improve.

In one embodiment, the server, before predictive modelling, determines the extent to which devices have a strong correlation with one another, and applies a threshold on the required correlation for devices to be in the same network.

In one embodiment, the server defines networks by nearest neighbour analysis grouping of devices based on IP address range, geographical location, type of access, and quality-of-service behaviour.

In one embodiment, the server augments the correlations with additional heuristics to prevent particular transient network outages from changing a network predictive model unnecessarily.

In one embodiment, the filter is a Kalman filter.

In one embodiment, an S-CSCF involves the resource availability server in session setup between devices, and said server uses its involvement in signalling for session management.

In one embodiment, the server receives update information from only a subset of the devices and network elements in a network, and uses said resource update information to extrapolate over parts of the network including devices and network elements from which it has not received update information.

In another aspect, the invention provides a user device comprising means for performing user device operations of any method defined above.

In a further aspect, the invention provides a resource availability server comprising means for performing resource availability server operations of any method defined above. In one embodiment, the server comprises:

a signalling module for receiving resource update information,
a database storing the signalled resource update information, and
a predictive model for each access network.

In a further aspect, the invention provides a network comprising a resource availability server, a plurality of devices, and a plurality of network elements adapted to perform any method defined above.

The invention also provides a computer program product comprising software code for performing user device operations of any method defined above when executing on a digital processor.

In another aspect, the invention provides computer program product comprising software code for performing server operations of any method defined above when executing on a digital processor.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

Figure 1:
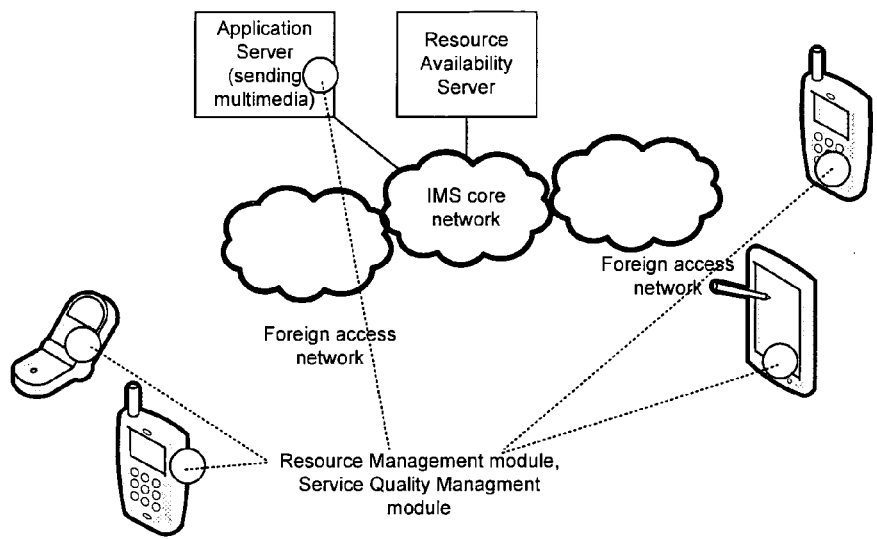
FIG. 1 is a diagram illustrating at a high level items involved in implementing the invention.

The invention provides real time dynamic resource management to improve end-to-end QoS by mobile devices regularly updating a resource availability server (RAS) with resource update information. Simple examples of resource update information are session bandwidth, delay, packet loss, and jitter. Other examples are device battery status, device screen mode, device or network element storage capacity, device or network element processing power, and device memory. This information is made available by the RAS. In addition, the RAS generates and maintains predictive models and makes available predictive data from these models. Network elements and devices retrieve this information in the form of notifications from the RAS or by way of querying the RAS. The network elements and devices, based on these predictions, act to negotiate sessions to optimise QoS.

In one embodiment the RAS is updated by only mobile devices subscribed to the operator which hosts the RAS. The update information is addressed to the RAS as a stand-alone entity. However, it is envisaged that the server may be hosted by multiple operators and may receive updates from devices subscribed to different operators. Also, it is envisaged that not only mobile devices but also network elements such as MMSCs may send update information.

In the following detailed embodiments the user devices are mobile devices, however in alternative embodiments the user devices may be fixed such as computers.

The peers of media sessions publish (by sending to the RAS) quality parameters which can include resource update information of devices, as set out above, of servers (e.g., server load), and session information such as bandwidth, delay, packet loss, and jitter to the RAS. Based on the quality parameters uploaded by those peers, the RAS builds a model of the current state of the whole network based on available quality parameters uploaded by many peers, allowing a myriad of control possibilities as will be seen from the use cases below.

It is only necessary for a subset of the devices and elements to publish the resource update information. The RAS uses the information to extrapolate using the predictive model to provide network-wide predictive data. Also, the RAS may in some embodiments additionally capture itself resource update information by monitoring signalling. Also, an S-CSCF may involve the RAS in session setup between devices, and the RAS then uses its involvement in signalling to initiate session management such as re-negotiation.

Actions arising from operation of the RAS include adaptation of multimedia and other data services in order to provide as good an end-user experience as possible both in-session and pre-session. Further, since the RAS updating and predicting is in real time, the invention advantageously provides such adaptation with dynamic modification during sessions according to resource availability, and/or user preferences and/or extended presence information.

The invention advantageously does not require changes in existing standard IMS architecture or changes to existing infrastructure elements or access networks, and uses defined extension methods of existing protocols to convey the information. Clients on the end devices communicate with the RAS. Importantly, session management (session negotiation, re-negotiation, set-up, abortion, or refusal) by the devices and network elements is performed by conventional components operating according to a protocol such as SIP.

The RAS acts as a central repository of information on the network and device characteristics. The RAS may also be part of a proxy in the network for the normal signalling traffic, using existing standardized and optional user-defined headers to extract additional resource update information from the signalling information. The RAS may be an application server residing on an S-CSCF in one embodiment. The RAS may alternatively be implemented as part of or an extension to, a presence server. The RAS keeps track of the network characteristics of particular access networks by using the update information from active devices in a predictive model of the access network. It thus models and predicts the characteristics of the network, advantageously based on a limited number of known samples. The modelling implicitly takes into account disturbances to the network, such as traffic from other users of the same access network that are not known to the operator, electrical interference, and battery power status leading to lower signal to noise ratio.

End devices negotiate a session using their knowledge of their own resources and knowledge of predicted status of the network from the RAS. Instead of reserving a dedicated bandwidth, the information from the RAS is used to negotiate a pragmatic bandwidth to provide a good user experience for the current state of the access network in a peer-to-peer session.

If end devices discover during a session (without being informed by the RAS) that service quality deteriorates or that the timing of the traffic indicates that significantly better service quality may be achievable, they re-negotiate the session. As part of the re-negotiation signalling, the RAS is informed of the changed state of the access network and uses this to update its model of the access network.

When the RAS detects or predicts that the service quality in one or more specific access networks (or a part thereof) deteriorates or that a significantly better service quality may be achievable, it will signal this information to all end devices and network elements that have subscribed to being notified of such. Upon receiving the notification, the end devices may re-negotiate the session with its peer to decrease or increase service quality.

If an application wishes to set up a session to an end device (for example for transmission of a video message or any other kind of multimedia stream), it consults directly or indirectly the RAS to determine the optimal time, media choice and media QoS for sending to the end device. Due to the use of a predictive model this is even possible when the specific handset is not currently active on the network. Based on the information in the RAS, the application can take appropriate measures such as choosing specific media content, or making a decision to schedule the message at another time. Additionally, an application server may request the RAS to notify it when the required bandwidth in the access network is available, if such a request cannot be met directly. An application server can also publish quality parameters and/or resource availability pertaining for example to sessions that it has with devices, as well as network element parameters (such as server load). It could also publish quality parameters and/or resource availability for inter-network element communication such as application server to application server communication.

In one embodiment, the RAS receives update information from devices and elements of an IMS network connected to multiple access networks. However, the invention may be applied to any controlled networks delivering services through uncontrolled access networks, controlling the behaviour of the end devices communicating through the uncontrolled access network, based on a predictive model of the behaviour of the uncontrolled access network.

Figure 2:
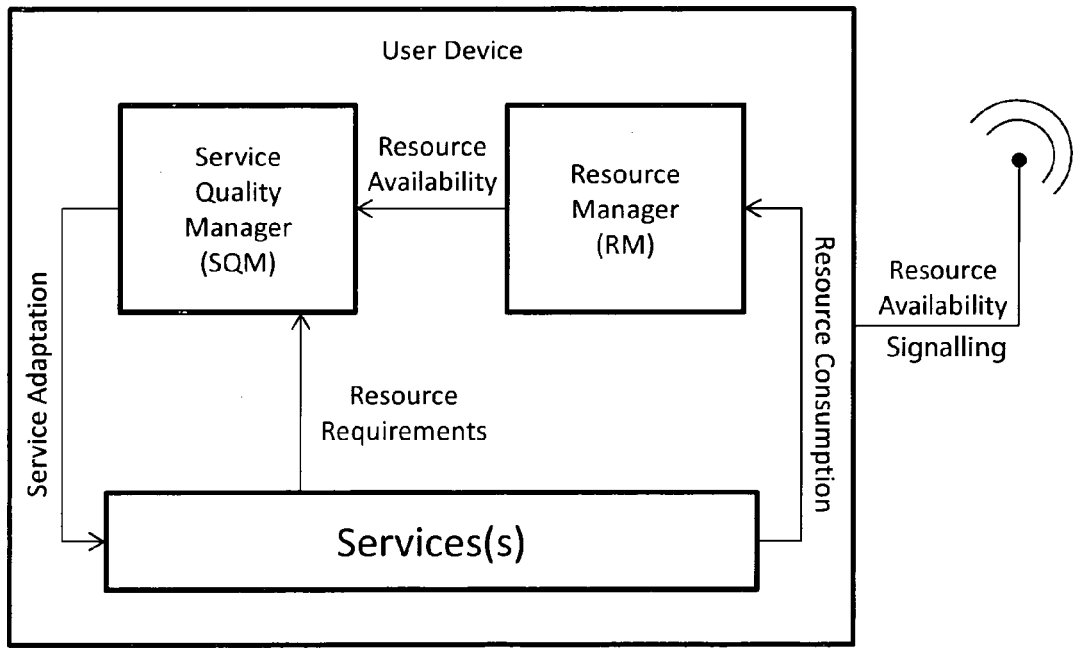
FIG. 2 is a block diagram of a user device.
Figure 3:
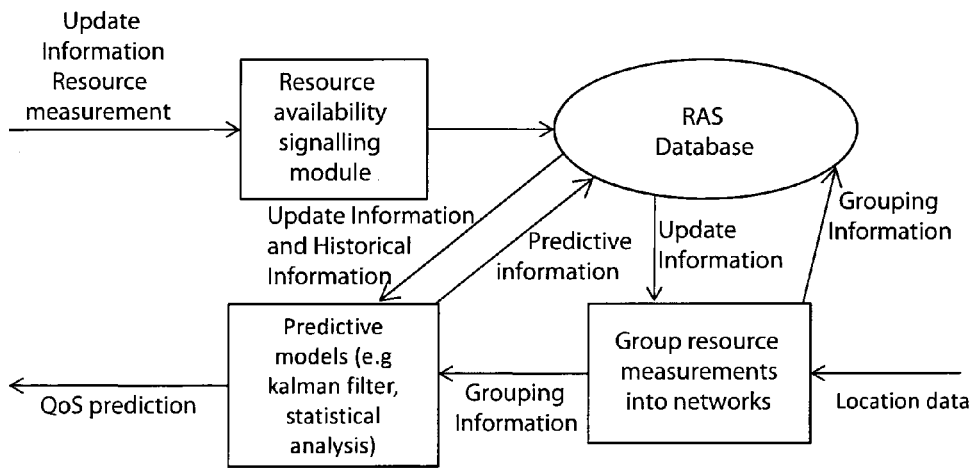
FIG. 3 is a diagram illustrating resource availability server (RAS) components.

As shown in FIGS. 1 and 2 a user device comprises resource management (RM) and session (or "service") quality management (SQM) components. Application servers are responsible for determining the end user QoS, based on monitored device and network characteristics, and the RAS acts as the central repository for resource data. Referring to FIG. 3, within the RAS, the following are the main components:

Resource availability signalling module: This module receives resource update information using standard signalling protocols. The update information may be received from a device or network element in a SIP signalling request. Alternatively, it may employ a dedicated protocol directly between a resource management component and the RAS or use an existing protocol (for example Presence using the SIP event notification framework) into which additional update information is inserted.

RAS database. This database contains the signalled resource update information (e.g. jitter measurements) from a device or network element and the predicted aggregated resource information such as congestion, bandwidth and delay for a specific access network a device is connected to. It also includes historical update and predicted information, that part being sometimes referred to as an "historical database". Devices and network elements can query the RAS database before setting up a session. As shown by the arrows in FIG. 3, the models retrieve update information and historical data from the RAS database for use in prediction. Also, predictive information and grouping information is fed to the RAS database, and is used to feed more comprehensive historical data subsequently.

Group Resource Measurements into Networks. Networks are defined by aggregating devices based on nearest neighbour analysis. This groups devices based on location and the extent to which devices have a strong correlation with respect to QoS behaviour with one another. This grouping information is fed to the models, further details below.

Predictive models (for different networks): The RAS contains predictive models for the different access networks that are used to enhance the QoS information of individual devices. The predictive models themselves can be implemented in various ways using different parameters:

As a statistical model (e.g., a Kalman filter or a Markov model) observing the traffic based on a simplified model of the network and using this information to determine overall state.

As a self-learning model (e.g., a neural network) using various inputs and 'learning' the behaviour of the access network over time, adapting itself as the usage of the services varies.

A simple linear model assuming the existence of a fixed amount of resources and just keeping track of current usage compared to historical information.

Parameters may comprise not only the different network characteristics such as bandwidth, delay, packet loss and jitter measured on the end devices or network elements, but also historical information correlating with for example time-of-day (peak hours tend to be the same over the time-of-day) and day-of-week (specific days have consistently more traffic than other days), and also location info (e.g. Cell Info, GPS Info, WiFi base station Info) and IP address ranges enabling a more refined view on the access network. Device specific information (battery status, radio transmitter used (e.g. WiFi, GPS).

The RM component is responsible for tracking local and network resources available to the end-user device in real-time. At the receiving device, this information is published by the RM component to the RAS to be accessed by the remote transmitting device. At the transmitting device, the RM component is responsible for gathering not only the resource availability data of the remote receiving device from the RAS, but also the predicted resource availability data for the different access networks involved in the communication from a predictive model in the RAS. The local and remote device and network resource availability data gathered by the RM component is an input to the SQM component inhabiting the transmitting device (local) for evaluation; as shown in FIG. 2.

QoS parameters measured by the end device are the standard RTP/RTCP QoS parameters jitter, packet loss, and delay. This information is determined from the incoming stream of RTP packets. Resource usage parameters communicated by the end device signify the actual bandwidth used. The actual bandwidth is characterized by the RTP transmission interval (in milliseconds) and the RTP packet size (including header overheads).

The RAS collects resource update information from the receiving end devices and delivers it to the transmitting end-device. An end-device can be transmitting multimedia, receiving multimedia, or both in a multimedia communication scenario, e.g. video messaging, interaction with video portal services, videoconferencing or video calls. It may make the information available to servers such as application servers, using the collected information to create a view on the overall status of the access network. A major difference from existing presence servers or an existing HSS is the ability to aggregate information across multiple devices and sessions and use this information to model the state of the access network and obtain a predicted QoS view (of which the actual load and characteristics are not known as it is owned by another operator or even might be the WiFi network of a private person) and disseminate this information to other devices in the same access network or application servers negotiating a new or re-negotiating an existing session.

For the RAS to operate properly, signalling of resource availability data from and to the RAS is needed. In order to be IMS-compliant, it is appropriate to employ the existing SIP control protocol (using defined extension methods of existing protocol(s) to convey the information) for resource availability signalling. However, in alternative embodiments, existing presence protocols can be re-used or extended to provide additional information on device resources and measured network conditions.

The RAS indicates the current resource availability status within the network to application servers and end devices when setting up a session, and also pro-actively sends this information to end devices that have a session between them whenever the bandwidth/delay characteristics of the network change. This allows end devices to renegotiate the quality of the connection without for example glitches or lost frames in video due to the dropping of packets as the re-negotiation takes place before the expected congestion and not due to packet loss or jitter. It also allows end devices to increase the quality of service when more resources, such as those providing more bandwidth, become available.

Figure 4:
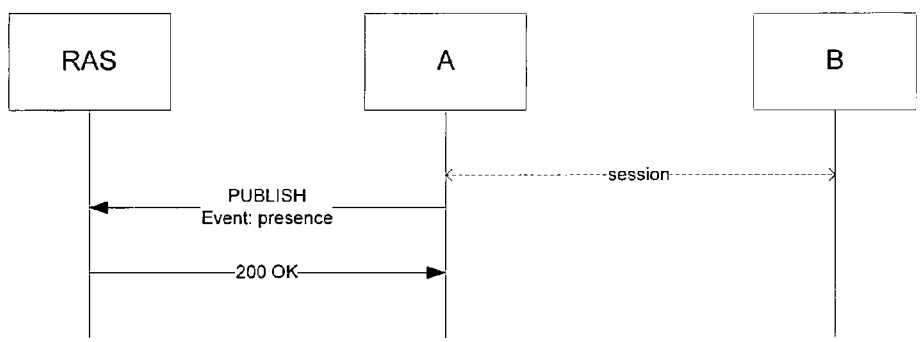
FIG. 4 is a diagram illustrating publishing of QoS parameters to the RAS during a session.

Referring to FIG. 4 the following is an example of parameters in the payload of a PUBLISH operation (represented in this embodiment in XML) from the device A to the RAS, indicating 150 ms delay, 5 ms jitter, 2% packet loss and a 70% battery level:

```
<device>
    <ras:delay>150</ras:delay>
    <ras:jitter>5</ras:jitter>
    <ras:packetloss>2</ras:packetloss>
    <ras:battery-level>70</ras:battery-level>
</device>
```

The load factor for a device is defined as a weighted linear or non-linear combination of the previous three parameters, e.g., $$\text{load factor} = (K_1 * \text{Delay} + K_2 * abs(\text{jitter}) + K_3 * \text{packetloss})$$

A high load factor corresponds to a decreased quality, which may be caused by a high network load.

From the load factor of the individual devices, the load factor of the network is calculated. Individual devices are seen as samples measured from a number of networks. Networks are defined by aggregating devices based on nearest neighbour analysis using:
  IP address ranges,
  geographical location info, (e.g. Cell Info, GPS Info, WiFi base station Info) enabling a more granular view on the access network,
  type of access info (e.g., whether access at a specific location is via 2G, GPRS, 3G, WiMAX, WiFi if this information is available). Multiple different access networks may be present at the same location and may seem to have the same IP address (e.g., through NAT rules), or any combination of the above.

The following techniques are used by the RAS in various embodiments for calculating the load factor:
  Kalman filters. All the load factors of the individual devices form the input vector to the Kalman filter. The output is the aggregate load factor for the networks as a whole that are distinguished as separate entities. This is standard practice in control engineering.
  Alternatively, statistical techniques like predictor correct filters or recursive least squares can be employed.

The Kalman filter models the internal state of the abstract model for the networks that are identified, resulting in the 'real-time load factor' at that moment in time. Based on this load factor alone, decisions already can be taken and the RAS server can update devices for trends seen in the network as a whole.

By storing the load factors in a historical database, in addition a historical control component can be added. By correlating the historical database based on time of day (peak hours tend to be the same over the time-of-day), day of week (specific days have consistently more traffic than other days), and week of year with the current load factor measured through the Kalman filters, a short term prediction based on historical trend can indicate whether quality is expected to deteriorate or improve.

An important factor in the effectiveness of the algorithm is the size of the access networks. The Kalman filter needs a sufficient number of samples to form a reliable model. Hence the number of devices in one network publishing measurements needs to be sufficient. The RAS receives measurements and location information of many devices. As the devices may reside in access networks unknown to the operator, the first step for the RAS is to group the individual devices into networks. Then for each defined network, a predictive model can be created. Devices in the same network are close together and show the same pattern in the QoS measurements. As already described some networks can be defined based on location information, thus taking a simple example if it is known that certain IP addresses belong to a particular access network, then for example one could determine that all devices having an IP address in that associated range belong to the same network. However if for example it is not known with which network IP addresses are associated, but GPS coordinates are available, the GPS co-ordinates do allow determination of the physical proximity of devices to each other, but do not guarantee that these devices are connected to the same access network. For example one device might be connected via GPRS while a device near by may be connected via Win. Thus advantageously there are scenarios where augmenting location information with the extent to which devices have a strong correlation with respect to QoS behaviour with one another can facilitate distinguishing between networks and defining networks.

By grouping devices based on location (either IP address range, or geographical location, or type of access information, or any combination of these) and the extent to which devices have a strong correlation with respect to QoS behaviour with one another, the networks can be defined. A correlation of 1 means that there is a perfect correlation between devices. A correlation of 0 means there is no correlation. By applying a threshold (such as 0.7) on the required correlation for devices to be in the same network, the areas that are seen as separate networks by the Kalman filter can be defined. Higher thresholds will give smaller but more uniform networks. Lower thresholds lead to larger networks comprising devices of varying QoS behaviour making it hard to make predictions. So there is a trade-off between the reliability of the predictions and the possibility to make a prediction at all.

The multitude of access networks (each of which can contain thousands of switches, routers, firewalls, base stations, radio controllers et cetera) is totally abstracted away using this method. End-points reside in abstract networks for which the statistical correlation determines which groupings of devices constitute a separately identifiable network. As a result, it is possible to detect both a congested geographical location that may be part of multiple networks of the same operator at the same time, as well as specific cells within foreign networks that suffer from a low QoS due to structural problems (e.g., aged base stations, or non-optimal radio planning) without having to know anything about those networks other than the measurements on the devices.

Device-specific information could also be stored, such as known quality of the radio interface of the device, e.g. is it better adapted for 3G, 2.5G (i.e. GPRS), 2G, or future generation technologies which would allow negotiation to effect session change to optimal radio interface for device as well as prevailing network conditions. Two examples of the use of device specific information are:

If it is known for a specific device that transmission quality is dependent on the battery status (e.g., the amount of output power it can generate), the battery status can be included as an input vector value to the Kalman filter. As a result, deterioration of the connection of that device due to battery limitations will not affect the overall network load factor anymore.

If it is known that specific devices are more sensitive to variations in QoS than other devices, the RAS using this as a heuristic can actively inform these devices to take measures when the prediction indicates a QoS decrease. For example, one type of phone may tend to be less robust in 3G than another type. If the 3G network quality deteriorates, the RAS sends a targeted recommendation to all devices of that type in the network to move back from 3G coverage to GPRS coverage (including eventual necessary codec changes). If an end user then is in a video call, he will notice that the image will be more pixelated but he will not lose frames or audio.

Informing devices to re-negotiate a connection based on network QoS may also be possible without implementing special client software on the device for devices using SIP signalling to a CSCF by using the following approach:

All SIP signalling traffic by two end devices is forwarded by the CSCF to the RAS.

The RAS modifies the signalling commands and especially the media capabilities and preferences based on network QoS.

If the RAS detects a transient network change, the RAS sends SIP messages to both devices. The devices each see this as the other device wishing to re-negotiate, but in fact it is the RAS enforcing this.

The RAS selects the common media parameters to be agreed and confirms that to both devices.

This way, the actual signalling is fully implemented in the network in a transparent manner to the devices. As a result, standard IMS devices without additional client software will be able to benefit as well from the QoS information obtained from the devices that do provide information to the RAS. The main benefit of this is that the number of updating devices connecting to the RAS can be significantly less than the total number of devices. The approach will work better with larger cell sizes, such as those in GSM networks and WiMAX. In addition, the method will work well with networks that are constrained as regards available interconnect bandwidth.

The server may augment the correlations with additional heuristics to prevent particular transient network outages from changing the total model unnecessarily. A simple heuristic for doing this is:

Calculate the correlation factor for a specific period of time (e.g., hourly, daily)

Store the correlation factors in the historical database.

Only adopt a new correlation that is found when it shows consistent behaviour over a certain period (e.g., only if the correlation is present for one week is a Kalman filter change performed to add the newly discovered network or remove a redundant network).

Thus the invention advantageously can have the session quality management ("SQM") component residing on the end-user devices (where they benefit from ease of access to local information and thus can more easily take the specific device characteristics of the device it is resident on into account) but also on network elements such as application servers. This is particularly advantageous for application servers in non-deterministic domains such as in the Internet domain.

In the evaluation process, the SQM component compares the required resources for different QoS levels of the service session and the available resources at the network, local and remote end-devices, determines the maximum achievable quality in real time and adapts QoS accordingly, optionally taking user preferences and other information such as presence information into account. For example, if the SQM component determines that even the lowest allowable quality for the multimedia session cannot be reached, it can switch to a different service type, e.g. it can switch to audio-only instead of audio plus video. In the invention the predictive model in the RAS uses information from other devices and other sessions in the same access network(s). As a result, the SQM component will be able to negotiate a stable quality more often and also to increase quality based on the predictions of the model, something that otherwise only can be achieved when actively probing the peer-to-peer connection.
Use Case 1: Publish QoS/Quality Parameters/Resource Availability Update FIG. 4)

An end device A signals to the RAS the specific quality of service for the session(s) it currently has open and its resource availability. The RAS accepts this information and uses it to update its internal prediction models allowing it to update its view of the current state of the network, and its resource availability database. This information is then used for the subsequent use cases. In a more refined model, end devices may just indicate their presence to a presence server when no sessions are active. The number of inactive devices in a certain access network then additionally can be taken into account in the predictive model.

Figure 5:
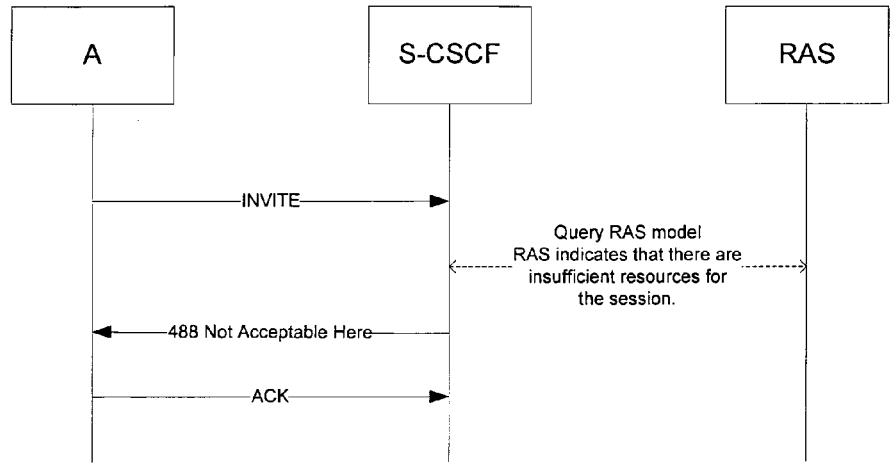
FIG. 5 is a diagram illustrating an S-CSCF querying the RAS to determine if it should allow a new session setup.

Use Case 2: Intelligent Service Denial (FIG. 5)

The network decides to temporarily bar delivery of a SIP-based voice call to multi-mode phones via a specific WiFi base station because this base station is predicted to become congested and the quality of the voice service cannot be guaranteed. To achieve this, the S-CSCF interrogates the RAS, which indicates that the actual quality level of the WiFi connection of this phone is predicted to be below par. Based on the resource availability it issues a reject to the end device. As a result, the end device may decide to use another means to connect such as for example the 3G network.

Figure 6:
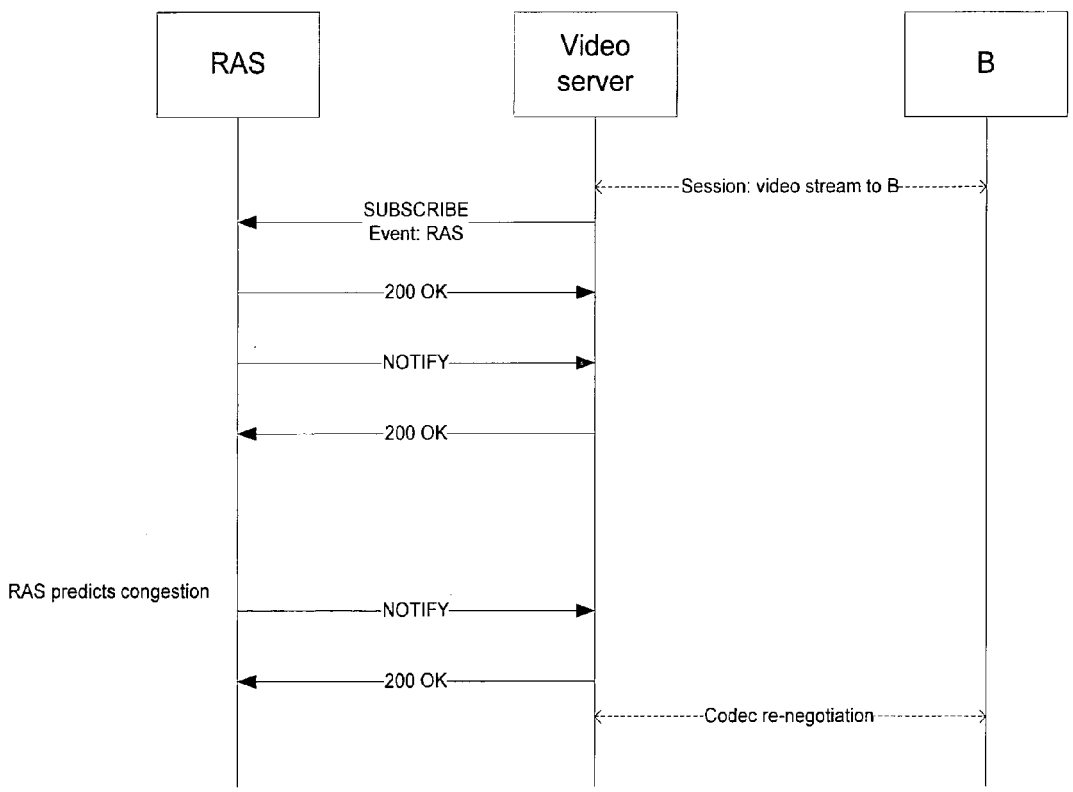
FIG. 6 illustrates messages for the RAS to notify a video server about upcoming network congestion.

Use Case 3: Application Server to Device, Quality Re-Negotiation on RAS Notification (FIG. 6)

When connecting for a specific session, e.g. when a long video clip is streamed to an end device, an application server subscribes to RAS notifications. The RAS updates the application server of the network quality using the SIP NOTIFY. If the RAS detects that either based on direct information or according to the model, the available bandwidth in a specific access network (or a part thereof) will be congested, it will signal this information to the application server(s) that have subscribed to this notification. Upon receiving the notification the application server may re-negotiate its session with its peer to decrease or increase bandwidth depending on the information sent by the RAS, thus for example allowing a decrease in quality without glitches or lost frames or an increase in quality when bandwidth becomes available. Note for simplicity this use case just illustrates the application server subscribing for and receiving RAS updates, but the end device could equally also have subscribed for RAS notifications and be updated by the RAS of the network quality (using the SIP NOTIFY).

In other embodiments the application server could be a video messaging server. On receiving a notification indicating network congestion and that a network session will not or is unlikely to support the codec quality of for example a long video mail, the video messaging server could decide to re-encode such a long video message into an alternative lower quality video codec, thus demanding less bandwidth to deliver or play-out the message. Alternatively for example, on determining that even the lowest allowable video quality for the multimedia session cannot be attained, the video messaging server could re-encode the message or perform delivery or play-out of the message as a different service type, e.g. providing audio-only instead of audio plus video.

The same approach can also be applied for a video portal session where the application server is a video portal. In another embodiment in the broadband domain, it may be applied to a wide range of multi-media/broadband networks in which video IVR services are provided or for example for streaming servers for Cable stations.

In yet another embodiment the application server could be a high speed IP Proxy server which upon for example being notified that available bandwidth in a specific IP access network (or a part thereof) is or is likely to be congested could employ techniques such as media compression or media resizing/re-transcoding to achieve IP optimization.

In yet another embodiment the application server could be a multi-user gaming server which is capable of responding to notifications on prevailing bandwidth in particular parts of the network, or access network or part thereof, by performing real time media adaption or media resizing/re-transcoding to achieve IP optimization on existing and new sessions.

Where the application server is capable of publishing information such as QoS parameters to the RAS it is possible to do measurements in the network even if the device does not have a client publishing information to the RAS. Because standard RTP sessions are set up between a device in an unknown network and the application server, the QoS of the communication across all streams to the RAS can be measured from information available at the application server (packet loss, jitter, delay in the RTP stream itself). By sending the information of all streams to the RAS from the application server, the RAS can construct a model taking into account all devices communicating with the application server, or even construct a model which also takes into account quality parameters and/or resource availability for inter-network element communication, published to the RAS, for example application server to application server communication.

Figure 7:
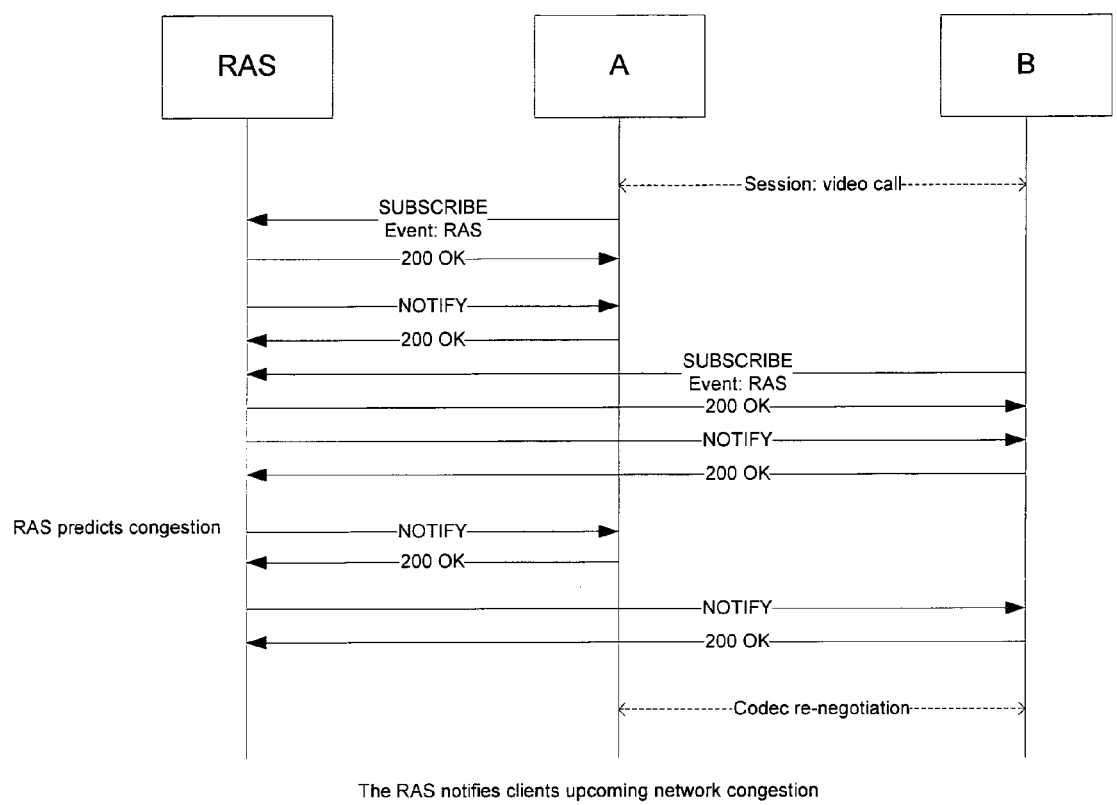
FIG. 7 illustrates messages for the RAS to notify clients about upcoming network congestion.

Use Case 4: Peer to Peer (Device), Quality Re-Negotiation on RAS Notification (FIG. 7)

When connecting for a specific session, e.g. video call, the two peer end devices subscribe to RAS notifications. The RAS updates the end devices of the network quality using the SIP NOTIFY. If the RAS detects that according to the model the available bandwidth in a specific access network (or a part thereof) will be congested it will signal this information to all end devices that have subscribed to this notification. Upon receiving the notification the end devices may re-negotiate the session with its peer to decrease or increase bandwidth depending on the information sent by the RAS, thus for example allowing a decrease in quality without glitches or lost frames or an increase in quality when bandwidth becomes available.

The invention is not limited to the embodiments described but may be varied in construction and detail. For example, the invention may be applied to sessions involving fixed devices or any type of device or network element involved in packet communication. Also, protocols other than the SIP protocol may be used. Also, it is envisaged that in other embodiments the devices and/or network elements do not negotiate or re-negotiate based on the data made available by the RAS, but instead the RAS is used as a feedback mechanism to monitor current and predicted network state from a QoS viewpoint. It may thus be used for example during a test or prototyping phase to assist with monitoring performance of proposed networks. Further, the RAS might physically be distributed over several interlinked servers. For example, one might be dedicated to receiving the resource updates, while another might be dedicated to generating the predictive models, and another might be dedicated to making the data available to the devices and network elements.

The network elements which inform the RAS and either receive notifications or query the RAS may include applications servers such as video messaging servers, high speed IP Proxy servers, MMSCs, and multi-user gaming servers. Also, the update information may only relate to devices and not network elements.

The invention claimed is:

1. A method performed in one or more communication packet networks comprising user devices and network elements, the method comprising the steps of:
   resource management components of at least some of the devices automatically sending resource update information to a resource availability server, and the resource availability server using said resource update information to generate a predictive model for network resource characteristics for communication sessions, and making available the resource update information and predictive model data as server output data.

2. The method as claimed in claim 1, wherein resource management components in network elements also transmit update information to the server.

3. The method as claimed in claim 1, wherein the resource management components measure communication parameters from RTP (real-time transport protocol) streams and include values of said parameters in the resource update information.

4. The method as claimed in claim 1, wherein the resource management components measure jitter, packet loss, and delay from incoming streams of RTP packets and bandwidth used as characterized by the RTP transmission interval and the RTP packet size, and upload said measurements to the resource availability server as update information.

5. The method as claimed in claim 1, wherein the update information includes device battery status, device screen mode, device or network element storage capacity, device or network element processing power, and device memory, and server load.

6. The method as claimed in claim 1, wherein a resource update component in at least one network element sends update information on behalf of a device with which it is communicating.

7. The method as claimed in claim 1, wherein the resource management components are incorporated in SIP (session initiation protocol) clients.

8. The method as claimed in claim 1, wherein the resource availability server automatically notifies session quality management components of devices and network elements of server output data which will allow them to manage sessions for improved quality of service, and the devices and network elements act upon such notifications to improve quality of service.

9. The method as claimed in claim 1, wherein session quality management components of at least some of the devices and network elements query the resource availability server, retrieve server output data in response to the query, and use said retrieved data to manage sessions to improve quality of service for the sessions.

10. The method as claimed in claim 8, wherein the session management includes session negotiation, re-negotiation, denial, and abortion.

11. The method as claimed in claim 8, wherein the update information is routed by at least some resource management components to the session quality management components in addition to being sent to the resource availability server, and the session management components use said data and server output to make session management decisions.

12. The method as claimed in claim 8, wherein the session quality management components also use user preference or profile data to make decisions on session management.

13. The method as claimed in claim 1, wherein the resource availability server is part of a proxy in the network for signalling traffic and extracts update information from said traffic and adds said information to update information received from the resource management components.

14. The method as claimed in claim 13, wherein the proxy is an S-CSCF (service call session control function).

15. The method as claimed in claim 1, wherein the resource availability server generates a predictive model of an access network to predict characteristics affecting a session between a device or network element in said access network and another device or network element.

16. The method as claimed in claim 8, wherein the resource availability server receives update information including feedback data concerning session re-negotiation by the session quality management components and updates the predictive model accordingly.

17. The method as claimed in claim 1, wherein the predictive model includes a statistical model.

18. The method as claimed in claim 1, wherein the predictive model includes a self-learning model to learn the behavior of an access network over time.

19. The method as claimed in claim 1, wherein the predictive model includes a linear model which tracks current usage.

20. The method as claimed in claim 1, wherein the server output data includes predicted network congestion and load factor.

21. The method as claimed in claim 1, wherein the server output data includes historical information associated with dates or times of day or with location.

22. The method as claimed in claim 1, wherein the resource availability server communicates with the devices and network elements according to the SIP control protocol.

23. The method as claimed in claim 1, wherein, when generating the predictive model, the resource availability server calculates a load factor for a device as a weighted linear or non-linear combination of parameters:

load factor=$(K_1*\text{Delay}+K_2*abs(\text{jitter})+K_3*\text{packetloss})$

24. The method as claimed in claim 1, wherein, when generating the predictive model, the server calculates the load factor of the network using individual device or network element load factors as samples.

25. The method as claimed in claim 15, wherein the server models a network by aggregating devices based on nearest neighbor analysis using IP address ranges, and/or geographical location, and/or type of access.

26. The method as claimed in claim 23, wherein the server calculates load factor using filters, in which all of the load factors of the individual devices form an input vector to a filter and the output is the aggregate load factor for the network as a whole.

27. The method as claimed in claim 26, wherein the server stores the load factors in a historical database, and correlates the historical data based on time of day, day of week, and week of year with the current load factor measured through the filters, and the predictive model provides a short term prediction based on historical trend to indicate whether quality is expected to deteriorate or improve.

28. The method as claimed in claim 25, wherein the server, before predictive modelling, determines the extent to which devices have a strong correlation with one another, and applies a threshold on the required correlation for devices to be in the same network.

29. The method as claimed in claim 28, wherein the server defines networks by nearest neighbor analysis grouping of devices based on IP address range, geographical location, type of access, and quality-of-service behavior.

30. The method as claimed in claim 28, wherein the server augments the correlations with additional heuristics to prevent particular transient network outages from changing a network predictive model unnecessarily.

31. The method as claimed in claim 26, wherein the filter is a Kalman filter.

32. The method as claimed in claim 1, wherein an S-CSCF involves the resource availability server in session setup between devices, and said server uses its involvement in signalling for session management.

33. The method as claimed in claim 1, wherein the server receives update information from only a subset of the devices and network elements in a network, and uses said resource update information to extrapolate over parts of the network including devices and network elements from which it has not received update information.

34. A user device comprising a resource management component adapted to automatically send resource update information to a resource availability server, and after a resource availability server has used said resource update information to generate a predictive model for network resource characteristics for communication sessions, and made the resource update information and predictive model data available as server output data, the resource management component accessing said output data.

35. A resource availability server adapted to: receive resource update information from resource management components of at least some of mobile devices, use said resource update information to generate a predictive model for network resource characteristics for communication sessions, and make available the resource update information and predictive model data as server output data.

36. The resource availability server as claimed in claim 35, wherein the server comprises:

a signalling module for receiving resource update information, a database storing the signalled resource update information, and a predictive model for each access network.

37. A network comprising a resource availability server adapted to:

receive resource update information from resource management components of at least some of mobile devices, use said resource update information to generate a predictive model for network resource characteristics for communication sessions, and make available the resource update information and predictive model data as server output data, a plurality of devices comprising a resource management component adapted to automatically send resource update information to a resource availability server, and after a resource availability server has used said resource update information to generate a predictive model for network resource characteristics for communication sessions, and made the resource update information and predictive model data available as server output data, the resource management component accessing said output data, and a plurality of network elements adapted to perform a method of claim 1.

38. A computer program product comprising a non-transitory computer readable medium for performing, when executing on a digital processor, the steps of receiving resource update information from resource management components of at least some mobile network devices, and using said resource update information to generate a predictive model for network resource characteristics for communication sessions, and making available the resource update information and predictive model data as server output data.

* * * * *

UNITED STATES PATENT AND TRADEMARK OFFICE
CERTIFICATE OF CORRECTION

PATENT NO. : 8,452,866 B2  Page 1 of 1
APPLICATION NO. : 12/733132
DATED : May 28, 2013
INVENTOR(S) : De Boer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 674 days.

Signed and Sealed this
Eighth Day of September, 2015

Michelle K. Lee
*Director of the United States Patent and Trademark Office*